United States Patent [19]
Peterson

[11] Patent Number: 5,321,940
[45] Date of Patent: Jun. 21, 1994

[54] MULTI-EDGE MOWER BLADE

[76] Inventor: Lloyd Peterson, 798 N. Shore Dr., New Richmond, Wis. 54017

[21] Appl. No.: 18,160

[22] Filed: Feb. 16, 1993

[51] Int. Cl.$^5$ .............................................. A01D 34/73
[52] U.S. Cl. ...................................... 56/255; 56/295
[58] Field of Search ......... 56/17.5, 255, 295, DIG. 20

[56] References Cited

U.S. PATENT DOCUMENTS

| | | | |
|---|---|---|---|
| 3,703,071 | 11/1972 | Anderson | 56/295 |
| 3,780,509 | 12/1973 | Woelffer | 56/295 |
| 4,262,476 | 4/1981 | Benenati | 56/295 |
| 4,977,735 | 12/1990 | Davis | 56/295 |
| 5,199,251 | 4/1993 | Rouse et al. | 56/255 |
| 5,259,176 | 11/1993 | Kahamura et al. | 56/255 |

Primary Examiner—David J. Bagnell
Attorney, Agent, or Firm—Joel D. Skinner

[57] ABSTRACT

A rotary, mulching lawn mower blade, comprising a central mounting portion having opposing ends and being for connection to an external drive structure, and a pair of end portions, one end portion being disposed at each central mounting portion end, the end portions each having at least two cutting members disposed at spatially vertically and horizontally separate locations with respect to each other, and the cutting members each having a cutting surface and a deflecting surface.

9 Claims, 2 Drawing Sheets

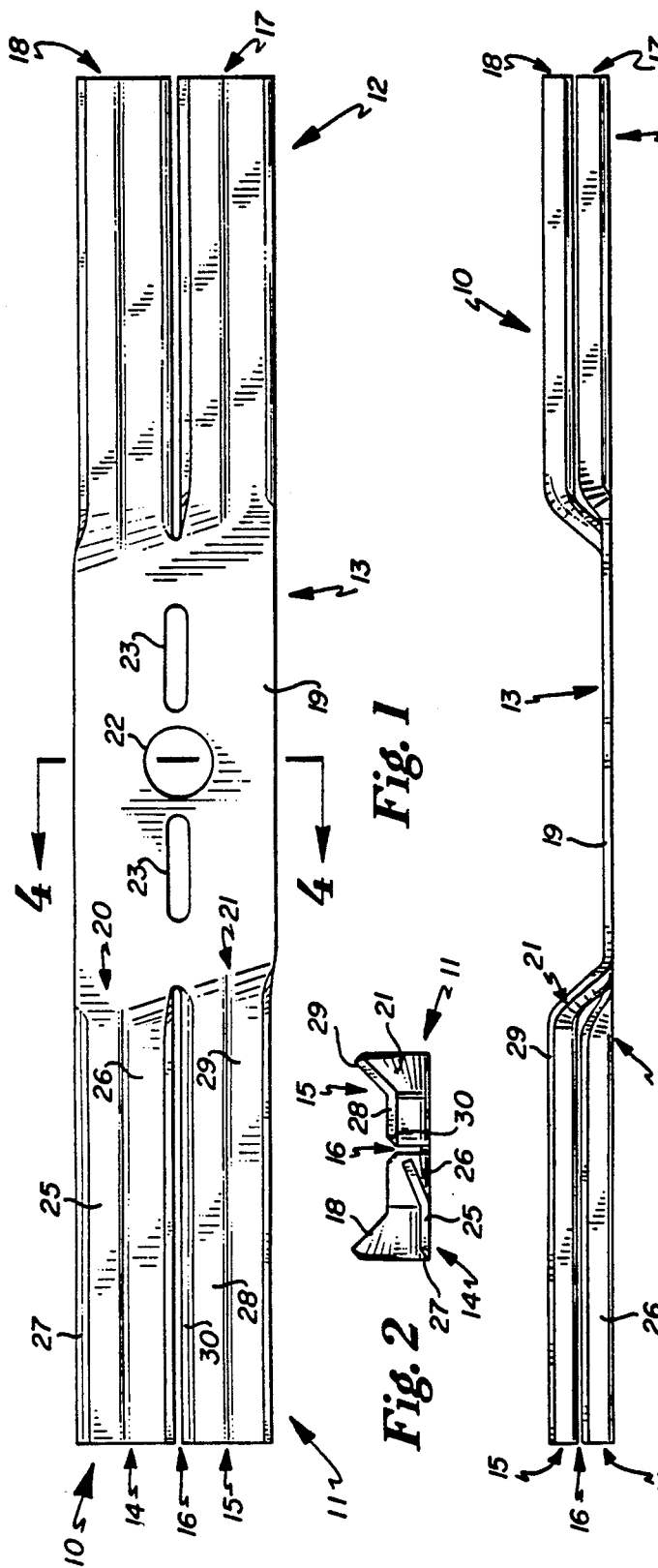

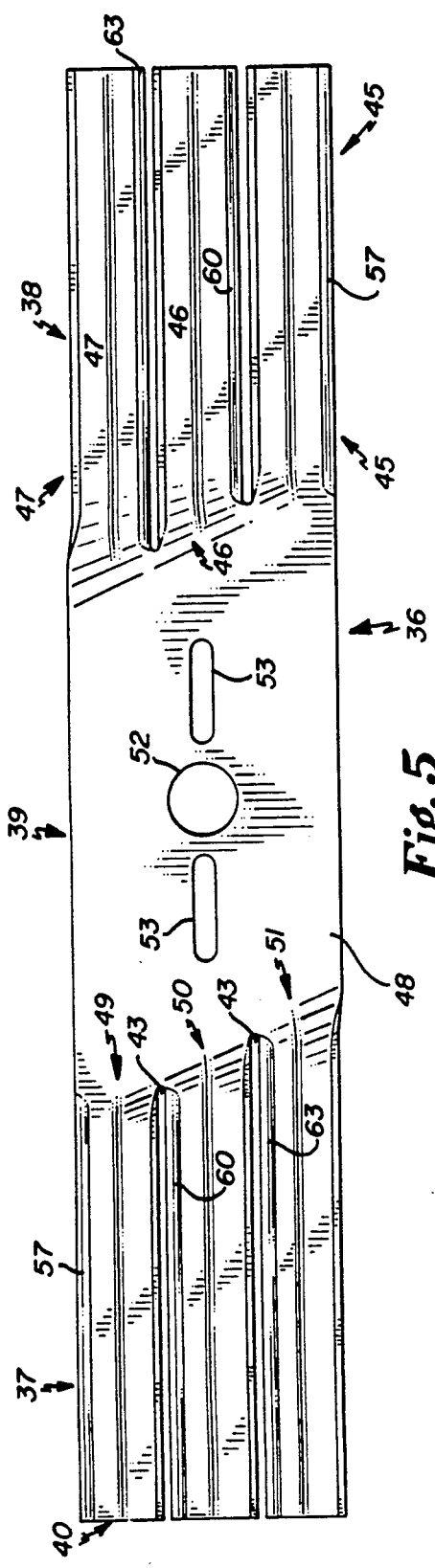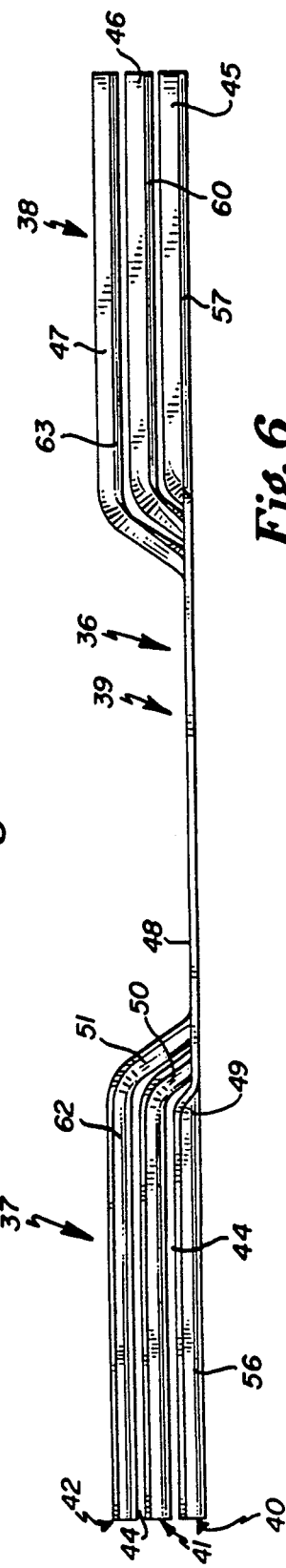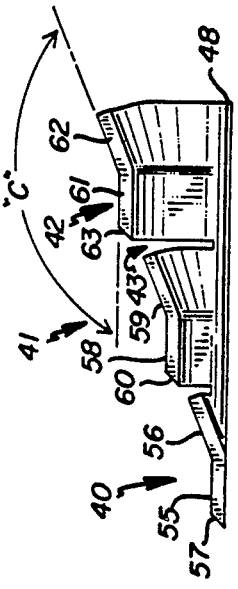

MULTI-EDGE MOWER BLADE

BACKGROUND OF THE INVENTION

This invention relates to cutting apparatus, and methods. More particularly, this invention relates to lawn mower blades which perform a mulching function. The cutting blade apparatus of this invention is useful, in conjunction with a standard lawn mower, for cutting and mulching grass or similar vegetation without the necessity of bagging or otherwise accumulating the grass clippings after the cutting process is completed.

In the past, various devices and/or methods have been used and proposed to cut grass and perform related lawn maintenance. However, these devices and methods have significant limitations and shortcomings, with respect to precision cutting of blades of grass with the simultaneous reduction in clipped grass blade size. Specifically, although various mower blade configurations exist which decrease blade noise, increase blade safety, and increase blade maneuverability, they do not provide structures which maximize mulching function.

Despite the need in the art for a mulching lawn mower blade, which overcomes the limitations and problems of the prior art, none insofar as is known has been proposed or developed. Accordingly, it an object of the present invention to provide a an improved blade structure which is reliable, durable, inexpensive, and effective at precision cutting grass and mulching the grass clippings, and which overcomes the limitations and shortcomings of the prior art. It is a particular object of the present invention to provide a mulching blade structure which maximizes the cutting of clippings by increasing clipping lift during the cutting process. A final object of this invention is to provide a mulching blade which is usable on standard, unmodified mower decks with a side or back discharge outlet, as well as with specialized mulching mowers.

SUMMARY OF THE INVENTION

The present invention provides a rotary, mulching lawn mower blade, comprising:

a central mounting portion having opposing ends and being for connection to an external drive structure, and a pair of end portions, one end portion being disposed at each central mounting portion end, the end portions each having at least two cutting members disposed at spatially vertically and horizontally separate locations with respect to each other, and the cutting members each having a cutting surface and a deflecting surface;

the lower cutting member being anteriorly disposed relative to its respective upper cutting member;

each cutting surface having a beveled anterior edge for cutting and a posterior edge at which the respective deflecting surface is connected;

each cutting surface of the cutting members having a flat configuration which is disposed in a plane which is parallel with the central mounting portion, and each deflecting surface having a flat configuration which extends upwardly from its respective cutting surface at a predetermined angle; and the respective cutting members being spatially separated from each other a predetermined horizontal distance and a predetermined vertical distance.

These and other benefits of this invention will become clear from the following description by reference to the drawings.

BRIEF DESCRIPTION OF THE DRAWINGS

FIG. 1 is a top view of the rotary mower blade apparatus of the present invention.
FIG. 2 is an end view of the blade.
FIG. 3 is a side view of the blade.
FIG. 4 is a crossectional view of the blade taken along line 4—4 of FIG. 1.
FIG. 5 is a top view of another embodiment of the rotary mower blade apparatus of this invention.
FIG. 6 is a side view of the blade shown in FIG. 5.
FIG. 7 is a partial side view of the blade taken from the left side of FIG. 6.

DESCRIPTION OF THE PREFERRED EMBODIMENT

The present invention is a multi-edged rotary lawn mower blade which is usable with a conventional lawn mower. The blade functions to provide uniform cutting of grass blades or leaves and further to mulch or reduce the size the grass blade clippings initially cut by the mower blade. Importantly, the mower blade is usable on lawn mowers having a standard, unaltered mower deck with an open side or rear outlet or discharge chute. No modifications of the mower or mower deck are necessary when using the mower blade of this invention. The blade may also be utilized on specialized mulching mowers however.

Referring to FIGS. 1-3, one embodiment of the multi-edged rotary mower blade 10 generally comprises a middle section 13 having first and second ends 11 and 12. The first blade end 11 further comprises a lower cutting member or blade 14 and an upper blade 15, and the second blade end 12 comprises a lower blade 17 and an upper blade 18. As is shown in these FIGURES, the blade 10 has an elongated, substantially flat configuration. The blade 10 further has a generally rectangular shape when viewed from the top. The two blade ends 11 and 12 are substantially mirror images of each other and are oriented in opposing directions so that as the blade 10 rotates in a clockwise direction as viewed in FIG. 1, the leading or anterior edge of each end 11 and 12 is oriented for cutting. The structure of the first end 11 only is described in detail herein, it being understood that the structure of the second end 12 is identical to it. The blade 10 having this structure is formed, for example, via a progressive metal stamping die process.

The middle section 13 is shown to have a flat, planar configuration formed of a thin, preferably metallic material. A mounting aperature 22 is centrally disposed in the middle section 13, for mating with a vertically oriented drive shaft of a lawn mower (not shown). A pair of alignment and/or securement slots 23 are also shown centrally disposed and longitudinally aligned in the middle section 13.

The first end 11 upper and lower blades 14 and 15 are shown to be integrally formed with the middle section 13 and extend therefrom via bent or twisted transition areas 20 and 21, respectively. The transition areas 20 and 21 are configured such that the lower and upper blades 14 and 15 are spatially vertically and horizontally separated from one another. Specifically, the lower blade or cutting member 14 is anteriorly disposed with respect to or leads the upper blade 15, in addition to being disposed at a lower vertical level with respect to the blade 15. A horizontal slot 16 is formed between the upper and lower blades 15 and 14 by metal shearing or sawing for example. The height differential between the lower and upper blades 14 and 15 is shown as slot 31 approximately ⅝ inches wide, wherein the effective total blade thickness is approximately 1.5 inches. The overall width of the blade end 11 is approximately 2.5 inches, and each blade 14 and 15 is approximately 1.25 inches wide. The slot 31 height effects the blade 10 length of the clippings. The overall width of the blade 10 is selected based on the mower deck height.

Referring also to FIG. 4, the lower blade or cutting member 14 is shown to comprise a thin, flat and horizontally oriented cutting surface 25 and a thin, upwardly oriented deflecting surface 26. The cutting surface 25 has a beveled, sharpened cutting edge 27 disposed at the leading or anterior edge of the surface 25. The deflecting surface 26 is disposed at the trailing or posterior portion of the cutting surface 25, and extends upwardly therefrom to form a lip structure. The deflecting surface 26 is formed via a bend in the cutting surface 25. The angle "A" formed between the cutting surface 25 and the deflecting surface 26 is approximately 157.5 degrees. The deflection angles "A" directs grass cut by surface 25 upwardly toward the upper blade 15 for mulching. The upper blade 15 also comprises a cutting surface 28 having a cutting edge 30, and a deflecting surface 29. The angle of incline "B" of the deflecting surface 29 with respect to the cutting surface 28 is approximately 135 degrees. This angle provides further lift and yields a blade height or thickness which conforms to common mower deck height requirements.

The cutting surface 25 of the lower blade 14 cuts the grass blades or other vegetation it contacts during rotary motion of the blade 10. The lower blade deflecting surface 26 acts as a structural stiffening member for the lower blade 14 and further lifts residual grass or vegetation clippings which are cut by the cutting surface 25. The lifting motion provided to the clippings causes them to remain aloft or suspended for a predetermined time period in the enclosed space below the mower deck. The cutting surface 28 of the trailing upper blade 15 functions to cut the suspended clippings and to thereby further reduce their size. The spacing 31 between the blades 14 and 15 establishes the maximum length of the grass clippings. The upper blade deflecting surface 29 acts as a structural stiffener for the upper blade 15 and also lifts cut or uncut clippings higher in the mower deck.

The combined effect of the cooperating upper and lower blades 14 and 15 is to maintain grass clipping airborne for an extended period of time to increase the likelihood that they will be cut a second or third time, for example. Additional cutting of the clippings reduces their size and has been shown to be desirable for mulching and fertilizing purposes. This multi-blade configuration, in addition to increasing the probability of the grass clipping being struck and cut by a trailing blade edge, also increases this probability by a reduction in the unobstructed discharge area of the mower deck. And finally, due to the increased cutting surface over that of a conventional blade design, engine drag is reduced, thereby reducing engine stress when cutting thick or excessively long grass.

Referring to FIGS. 5-7, another embodiment of the multi-edged rotary mower blade 36 generally comprises a middle section 39 having first and second ends 37 and 38. The first blade end 37 further comprises a lower cutting member or blade 40, a middle blade 41 and an upper blade 42, and the second blade end 38 comprises a lower blade 45, a middle blade 46 and an upper blade 47. As is shown in these FIGURES, the blade 36 has an elongated configuration which is slightly wider than that of the bifurcated blade embodiment 10. As shown in FIG. 5, the blade 36 further has a generally rectangular shape when viewed from the top. The two blade ends 37 and 38 are substantially mirror images of each other and are oriented in opposing directions so that as the blade 36 rotates in a clockwise direction as viewed in FIG. 5, the leading edge of each end 37 and 38 is oriented for cutting. The structure of the first end 37 only is described in detail herein, it being understood that the structure of the second end 38 is identical to it.

The middle section 39 is shown to have a flat, planar configuration formed of a thin, preferably metallic material. A mounting aperture 52 is centrally disposed in the middle section 39, for mating with a vertically oriented drive shaft of a lawn mower (not shown). A pair of alignment and/or securement slots 53 are also shown centrally disposed and longitudinally aligned in the middle section 39.

The first end 37 upper, middle and lower blades or cutting members 40-42 are shown to be integrally formed with the middle section 39 and extend therefrom via bent or twisted transition areas 49, 50 and 51, respectively. The transition areas 49-51 are configured such that the blades 40-42 are spatially vertically and horizontally separated from one another. Specifically, the lower blade or cutting member 40 is anteriorly disposed with respect to or leads the middle and upper blades 41 and 42, in addition to being disposed at a lower vertical level. Similarly, the middle blade 41 leads the upper blade 42. Horizontal slots 43 are formed between the upper and middle blades 42 and 41, and between the middle and lower blades 41 and 40. The height differential between the blades 40-42 is shown as slot 44. The overall width of the blade end 37 is approximately 3 inches, and each blade 40-42 is approximately 1 inch wide. The blade 36 thickness is approximately 1 7/8 inches.

The lower blade or cutting member 40 is shown to comprise a thin, flat and horizontally oriented cutting surface 55 and an upwardly oriented thin deflecting surface 56. The cutting surface 55 has a beveled, sharpened cutting edge 57 disposed at the leading or anterior edge of the surface 55. The deflecting surface 56 is disposed at the trailing or posterior portion of the cutting surface 55, and extends upwardly therefrom to form a lip structure. The angle "C" formed between the cutting surface 55 and the deflecting surface 56 is approximately 157.5 degrees. The middle and upper blades 41 and 42 also comprise a cutting surface 58 and 61 having a cutting edge 60 and 63, and a deflecting surface 59 and 62. The angle of incline of the deflecting surfaces 59 and 62 with respect to their respective cutting surfaces 58 and 61 is also approximately 157.5 degrees. This angle provides an optimum balance between clipping direction, clipping lift and effective blade 36 thickness for purposes of mower deck fit.

As many changes are possible to the embodiments of this invention utilizing the teachings thereof, the descriptions above, and the accompanying drawings should be interpreted in the illustrative and not the limited sense.

That which is claimed is:

1. A rotary cutting blade, comprising a central mounting portion having opposing ends and being for connection to an external drive structure, and a pair of end portions, one end portion being disposed at each said central mounting portion end, said end portions each having a lower cutting member and an upper cutting member disposed at spatially vertically and horizontally separate locations with respect to each other, said lower cutting member being anteriorly disposed relative to its respective upper cutting member, and said cutting members each having a cutting surface and a deflecting surface, said cutting surface having a beveled anterior edge for cutting and a posterior edge at which said respective deflecting surface is connected, said cutting surface further having a flat configuration which is disposed in a plane which is parallel with said central mounting portion, and said deflecting surface having a flat configuration which extends upwardly from it respective said cutting surface at a predetermined angle.

2. The rotary cutting blade of claim 1, wherein said central mounting portion has a flat, planar configuration and at least one mounting aperture generally centrally disposed therein.

3. The rotary cutting blade of claim 2, wherein said cutting members are integrally connected with said central mounting portion via twist regions.

4. The rotary cutting blade of claim 1, wherein said lower cutting members have a first deflection angle and said upper cutting members have a second deflection angle.

5. The rotary cutting blade of claim 4, wherein said first deflection angle is approximately 157.5 degrees and wherein said second deflection angle is approximately 135 degrees.

6. The rotary cutting blade of claim 1, wherein each said lower and respective upper cutting member are spatially separated from each other a predetermined horizontal distance and a predetermined vertical distance.

7. The rotary cutting blade of claim 1, wherein the blade is utilized as a lawn mower blade in conjunction with a conventional lawn mower having an unaltered mower deck and open outlet chute for cutting and mulching purposes.

8. A rotary cutting blade, comprising:
a central mounting portion having opposing ends and being for connection to an external drive structure, and a pair of end portions, one end portion being disposed at each said central mounting portion end, said end portions each having at least two cutting members disposed at spatially vertically and horizontally separate locations with respect to each other, and said cutting members each having a cutting surface and a deflecting surface;
the lower-most cutting member being anteriorly disposed relative to its respective upper cutting member;
each said cutting surface having a beveled anterior edge for cutting and a posterior edge at which said respective deflecting surface is connected; and
each said cutting surface of said cutting members having a flat configuration which is disposed in a plane which is parallel with said central mounting portion, and each said deflecting surface having a flat configuration which extends upwardly from its respective said cutting surface at a predetermined angle.

9. A rotary cutting blade, comprising a central mounting portion having opposing ends and being for connection to an external drive structure, and a pair of end portions, one end portion being disposed at each said central mounting portion end, said end portions each having a lower cutting member, a middle cutting member, and an upper cutting member disposed at spatially vertically and horizontally separate locations with respect to each other, said lower cutting member being anteriorly disposed relative to its respective middle and upper cutting members and said middle cutting member being anteriorly disposed relative to its respective upper cutting member, and said cutting members each having a cutting surface and a deflecting surface.

* * * * *